Patented Sept. 21, 1954

2,689,817

UNITED STATES PATENT OFFICE 2,689,817

PROPIONIC ACID FROM WOOD PULP WASTE LIQUOR

Fred Fortess and Blanche B. White, Summit, N. J., assignors to Celanese Corporation of America, New York, N. Y., a corporation of Delaware No Drawing. Application December 17, 1949, Serial No. 133,687

3 Claims. (Cl. 195—47)

This invention relates to the fermentation of wood pulp waste liquor and relates more particularly to the fermentation of wood pulp waste liquor with bacteria of the genus Propionibacterium.

At the present time, the major portion of the waste liquor produced by the wood pulp industry is discarded, as in the case of sulfite waste liquor, or burned to recover the inorganic materials therein, as in the case of sulfate waste liquor. This practice is highly uneconomic, since there is a complete loss of the organic materials contained in the waste liquor. In addition, when the waste liquor is discarded, a considerable expense is often involved in treating the waste liquor to prevent water pollution.

It is an important object of this invention to avoid this loss and to provide a process for converting a portion of the organic materials present in wood pulp waste liquor into commercially valuable products.

A further object of this invention is the provision of a process for the fermentation of wood pulp waste liquor with bacteria of the genus Propionibacterium.

Other objects of this invention will be apparent from the following detailed description and claims.

In accordance with our invention, wood pulp waste liquor is fermented with bacteria of the genus Propionibacterium. During the fermentation, substantially all of the sugars present in the waste liquor, including the monosaccharide pentoses and hexoses such as dextrose (glucose), mannose, galactose, arabinose and xylose; the disaccharides such as sucrose and cellobiose; and even the higher molecular weight sugars, are converted at high yields into propionic acid together with smaller quantities of acetic acid or mixtures of acetic and butyric acids. In addition to the production of high yields of commercially valuable products, we have found that the fermentation of wood pulp waste liquor with bacteria of the genus Propionibacterium is not seriously retarded by the various organic and inorganic materials present in the waste liquor and is self-sterilizing to an appreciable degree. As a result, the fermentation may be carried out with a minimum of pretreatment of the waste liquor and is not readily contaminated by other bacteria, yeasts and the like.

The process of our invention may be carried out with sulfite waste liquor normally containing about 2 to 3% of sugars having a typical analysis of about 50% dextrose, 15% mannose, 8% galactose and 27% of the pentoses, xylose and arabinose. Before fermentation, the sulfite waste liquor must be treated to eliminate therefrom the free and loosely combined sulfur dioxide present therein. The sulfur dioxide may be stripped from the sulfite waste liquor by steam distillation or by a reduced pressure flash-off of hot sulfite waste liquor, such as is drained from wood pulp upon completion of digestion. After stripping the sulfur dioxide, the sulfite waste liquor may be brought to between the pH 6.5 and 7.5 preparatory to fermentation by the addition of lime, sodium hydroxide or other suitable alkaline material.

The sulfur dioxide may also be eliminated by bringing the sulfite waste liquor to between about pH 8.5 and 9.5 with lime, causing the sulfur dioxide to precipitate as the sulfite which may be separated from the waste liquor in any manner known in the art such as filtration, for example. By bringing the sulfite waste liquor to between about pH 10 and 11 with lime, the lignin as well as the sulfur dioxide may be precipitated and recovered from the sulfide waste liquor. However, this practice is somewhat less desirable since it increases the consumption of chemicals, degrades the sugars and removes a portion of the sugars present in the waste liquor by occlusion in the precipitated lignin. Following the precipitation of the sulfur dioxide, the sulfite waste liquor may be brought to between about pH 6.5 and 7.5 preparatory to fermentation by the introduction of carbon dioxide into the waste liquor, for example. The free and loosely-combined sulfur dioxide may also be eliminated from the sulfite waste liquor simply by neutralizing the same to between about pH 6.5 and 7.5 with lime, sodium hydroxide or other alkaline material. However, the sulfites and bisulfites that remain in the waste liquor after neutralization cause a reduction in the yield of the desired products and increase the time required to complete the fermentation, as well as necessitating an increased consumption of chemicals at later stages of the process.

Prior to fermentation, up to about 50% of the water in the sulfite waste liquor may be removed, increasing the total solids content of the waste liquor up to about 20% by weight. The removal of the water also increases the sugar content of the waste liquor up to about 4.5% by weight and reduces the required fermentation vat volume by up to about 50%. It has been found that this increased concentration of solids in the sulfite waste liquor does not have an unfavorable effect upon either the speed of fermentation or the yield of the desired products, whereas sulfite waste liquor concentrated to 30% by weight total solids will not ferment. Advantageously, the removal of the water and sulfur dioxide from the sulfite waste liquor may be effected simultaneously during the steam-stripping or flash-off referred to above.

To obtain a complete and rapid fermentation of the sugars, the sulfite waste liquor may have added thereto a small proportion of nutrients, including growth factors and nitrogen sources, which are necessary for the growth and rapid multiplication of the bacteria of the genus Propionibacterium. Suitable growth factors for this purpose, containing the vitamin B, riboflavin, amino acids and the like required by the Propionibacterium, are, for example, yeast extract, tryptone, malt sprouts and barley sprouts, which may be present in the sulfite waste liquor in an amount of from about 0.2 to 1.0% by weight. Suitable nitrogen sources are, for example, urea, ammonium sulfate, and dibasic ammonium phosphate, which may be present in the sulfite waste liquor in an amount of from about 0.2 to 1.0% by weight. The sulfite waste liquor may be enriched by the addition of other sources of sugar such as molasses, for example, to increase the yield and concentration of propionic and other acids in the fermented liquor. However, the concentration of sugars should not be increased above about 10% by weight, since the speed of fermentation and the yield of the desired products decreases rapidly with higher sugar concentrations. The addition of molasses to the sulfite waste liquor provides at least a portion of the growth factors required by the bacteria of the genus Propionibacterium, permitting the addition of other growth factors to be curtailed or eliminated.

Among the bacteria that may be employed in carrying out our invention are, for example, *Propionibacterium shermanii* with its associative bacteria *Lactobacillus casei* which together produce a mixture of propionic and acetic acids; *Propionibacterium thoenii* which, depending upon the fermentation conditions, produces a mixture of propionic and acetic or propionic, butyric and acetic acids; *Propionibacterium pentosaceum* which produces a mixture of propionic, acetic and butyric acids; and *Propionibacterium arabinosum* which produces a mixture of propionic, acetic and butyric acids. During the fermentation, the sulfite waste liquor is advantageously kept at between about pH 6.5 and 7.5 by the continuous or periodic addition of a suitable alkaline material such as lime slurry or sodium hydroxide solution, for example. The temperature of the sulfite waste liquor is preferably maintained between about 28 and 34° C. to obtain the most rapid fermentation.

The fermentation may be carried out on a batch basis by inoculating the conditioned sulfite waste liquor with the desired bacteria and holding the temperature and pH of the batch within the desired range until the fermentation is complete, which normally takes from about 8 to 14 days. However, it is preferred to carry out the fermentation in a continuous manner, for example, by flowing the conditioned sulfite waste liquor through a series of vats containing the desired bacteria, since, in this manner, it is possible to reduce the total fermentation time to between about 3 and 4 days. Each of the vats is preferably equipped with a slow speed stirrer to insure a thorough mixing of the bacteria, which tend to settle out and form a relatively dense lower layer, and the sulfite waste liquor passing therethrough to obtain the maximum yield of acids in a minimum period of time.

The process of our invention may also be carried out with sulfate waste liquor to convert the sugars therein into commercially valuable products, it having been found that the fermentation with bacteria of the genus Propionibacterium is not inhibited by the various sulfur compounds that are normally present in the sulfate waste liquor. In preparing the sulfate waste liquor for fermentation, it is simply necessary to adjust the pH, by the addition of carbon dioxide, for example, and the temperature of the waste liquor to the values specified above and add the nutrients necessary for the growth and multiplication of the bacteria. If desired, the sulfate waste liquor may also be concentrated and/or enriched with an additional quantity of sugar to obtain an increased yield and concentration of propionic and other acids. After the propionic and other acids produced during the fermentation have been separated, the sulfate waste liquor may be burned in a manner known in the art to recover the inorganic materials present therein for further use.

Following the completion of fermentation, the propionic and other acids may be recovered from the waste liquor in any desired manner. For example, the fermented waste liquor is acidified with sulfuric or other strong acid to liberate the propionic and other organic acids produced during the fermentation, following which the fermented waste liquor may be filtered or otherwise treated to remove the bacteria of the genus Propionibacterium therefrom. The propionic and other acids may then be recovered by steam distillation. However, it is preferred to recover the propionic and other acids by solvent extraction employing the solvent mixture disclosed in U. S. application S. No. 133,686, filed on even date herewith. According to the invention described in this application, the acidified, fermented waste liquor is extracted in one or a plurality of stages with a mixture containing a trialkyl phosphate such as tripropyl phosphate or tributyl phosphate, for example, and a hydrophobic diluent such as benzene, toluene, cyclohexane, methylene chloride, trichloroethylene or 1,2-dichloroethane, for example, capable on distillation of forming with water an azeotrope having a boiling point below the boiling point of the acids. The solvent phase is then separated from the aqueous phase and distilled, the hydrophobic diluent and the water that dissolves in the solvent phase during the extraction coming off together as an azeotrope. A sufficient quantity of an alkaline buffer such as, for example, sodium citrate, dibasic sodium phosphate, sodium bicarbonate or sodium propionate is then added to neutralize any free sulfuric acid in the solvent phase, and the propionic and other acids are distilled from the solvent phase preferably at subatmospheric pressure to maintain the temperature below about 150° C. The propionic and other acids are recovered by this process in highly concentrated or substantially anhydrous form.

The following examples are given to illustrate this invention further.

*Example I*

A calcium base sulfite waste liquor is steam-stripped to remove all the free and loosely combined sulfur dioxide therefrom and is concentrated to a total solids content of 20% by weight, at which time it contains 4.5% by weight of sugars. The waste liquor is adjusted to pH 7 by the addition of lime, and 1% by weight of urea and 1% by weight of dried yeast extract are incorporated therein. The treated waste liquor is inoculated with a culture of *Propionibacterium shermanii* and *Lactobacillus casei* and fermented for a period of 16 days at a temperature of about 30° C., with intermittent additions of a lime slurry to maintain the waste liquor between pH 6.5 and 7.5. At the completion of the fermentation, the waste liquor is acidified with sulfuric acid, filtered and extracted with a solvent to recover the organic acids present therein. There is obtained a yield of 61% by weight of acids based upon the original weight of the sugars, of which 45% is propionic acid and 16% is acetic acid. This yield is equivalent to 74% of theoretical, assuming all the sugars in the waste liquor to be hexoses.

*Example II*

A sulfate waste liquor containing 2.25% of sugars is adjusted to pH 7.0 by acidification with carbon dioxide; and 1% by weight of dibasic ammonium phosphate and 1% by weight of dried yeast extract are incorporated therein. The treated waste liquor is inoculated with a culture of *Propionibacterium arabinosum* and fermented for a period of 12 days at a temperature of about 30° C. with intermittent additions of sodium hydroxide solution to maintain the waste liquor between pH 6.5 and 7.5. At the completion of the fermentation, the waste liquor is acidified with sulfuric acid, filtered and extracted with a solvent to recover the organic acids present therein. There is obtained a yield of 55% by weight of acids based upon the original weight of the sugars, which yield is equivalent to 67% of theoretical, assuming all the sugars in the waste liquor to be hexoses.

*Example III*

A calcium base sulfite waste liquor is brought to between pH 8.5 and 9.5 by the addition of lime and filtered to remove therefrom the precipitated sulfites and sulfates, at which time it contains 2.75% by weight of sugars. The waste liquor is adjusted to pH 7.0 by the introduction of carbon dioxide, and 1% by weight of urea and 1% by weight of dried yeast extract are incorporated therein. The treated waste liquor is inoculated with a culture of *Propionibacterium pentosaceum* and fermented for a period of 16 days at a temperature of about 30° C. with intermittent additions of a lime slurry to maintain the waste liquor between pH 6.5 and 7.5. At the completion of the fermentation, the waste liquor is acidified with sulfuric acid, filtered and extracted with a solvent to recover the organic acids present therein. There is obtained a yield of 70% by weight of acids based upon the original weight of the sugars, which yield is equivalent to 85% of theoretical, assuming all the sugars in the waste liquor to be hexoses.

*Example IV*

A calcium base sulfite waste liquor is brought to between pH 10 and 11 by the addition of lime and filtered to remove therefrom the precipitated sulfites, sulfates and calcium lignosulfonate. A sufficient quantity of molasses is added to the waste liquor to bring the sugar content up to 6% by weight. The waste liquor is adjusted to pH 7 by the introduction of carbon dioxide and 0.5% by weight of yeast extract and 0.5% by weight of dibasic ammonium phosphate are incorporated therein. The treated waste liquor is inoculated with a culture of *Propionibacterium arabinosum* and fermented for a period of 12 days at a temperature of about 30° C. with intermittent addition of lime to maintain the waste liquor between pH 6.5 and 7.5. At the completion of the fermentation, the waste liquor is acidified with sulfuric acid, filtered and extracted with a solvent to recover the organic acids present therein. There is obtained a yield of 60% by weight of acids based upon the original weight of the sugars, which yield is equivalent to 73% of theoretical, assuming all the sugars in the waste liquor to be hexoses.

*Example V*

A culture of *Propionibacterium arabinosium* is established in three vessels having an inlet leading to the bottom of the first vessel for the introduction of the waste liquor, an overflow leading from the top of the first vessel to the bottom of the second vessel, an overflow leading from the top of the second vessel to the bottom of the third vessel and an overflow leading from the top of the third vessel for the removal of the fermented waste liquor. A calcium base sulfite waste liquor is steam stripped to remove all the free and loosely combined sulfur dioxide therefrom and is concentrated to 75% of its original volume, at which time it contains 4.0% by weight of sugars. The waste liquor is adjusted to pH 6.5 to 7.0 by the addition of sodium hydroxide and 0.5% by weight of yeast extract and 0.5% by weight of urea are incorporated therein. The treated waste liquor is flowed continuously through the three vessels in series at a rate to give a total retention time of the waste liquor in the system of 3.2 days with the temperature at about 30° C. and with intermittent additions of sodium hydroxide to each of the vessels to maintain the waste liquor between pH 6.5 and 7.5. The overflow from the third vessel is acidified with sulfuric acid, filtered and extracted with a solvent to recover the organic acids present therein. After fermentation equilibrium is established, the overflow contains 57-62% by weight of acids based upon the original weight of the sugars, which is equivalent to 68-74% of theoretical, assuming all the sugars in the waste liquor to be hexoses.

It is to be understood that the foregoing detailed description is given merely by way of illustration and that many variations may be made therein without departing from the spirit of our invention.

Having described our invention, what we desire to secure by Letters Patent is:

1. In a process for the production of propionic acid from sulfite waste liquor, the steps which comprise removing sulfur dioxide from the sulfite waste liquor, and flowing the sulfur dioxide-free sulfite waste liquor continuously through a series of vessels containing bacteria of the genus Propionibacterium.

2. In a process for the production of propionic acid from sulfite waste liquor, the steps which comprise steam-stripping sulfur dioxide from the sulfite waste liquor, adjusting the sulfur dioxide-free sulfite waste liquor to between about pH 6.5 and pH 7.5, and flowing the sulfite waste liquor continuously through a series of vessels containing bacteria of the genus Propionibacterium and maintained between about pH 6.5 and pH 7.5.

3. In a process for the production of propionic acid from sulfite waste liquor, the steps which comprise precipitating the sulfites and sulfates from the sulfite waste liquor by adding to the sulfite waste liquor lime in a quantity sufficient to bring the sulfite waste liquor to between about pH 8.5 and pH 9.5, separating the precipitated sulfites and sulfates from the sulfite waste liquor, adjusting the sulfite waste liquor to between about pH 6.5 and pH 7.5, and flowing the sulfite waste liquor continuously through a series of vessels containing bacteria of the genus Propionibacterium and maintained between about pH 6.5 and pH 7.5 and at a temperature of between about 28 and 34° C.

References Cited in the file of this patent

UNITED STATES PATENTS

| Number | Name | Date |
|---|---|---|
| 1,218,638 | Fest | Mar. 13, 1917 |
| 1,221,058 | Jernberg | Apr. 3, 1917 |
| 1,253,854 | Marchand | Jan. 15, 1918 |
| 1,898,329 | Wilson | Feb. 21, 1933 |
| 2,022,664 | Groombridge et al. | Dec. 3, 1935 |
| 2,167,556 | Smull | July 25, 1939 |
| 2,228,628 | Hahn | Jan. 14, 1941 |
| 2,415,777 | Weizmann | Feb. 11, 1947 |
| 2,430,355 | McCarthy | Nov. 4, 1947 |